May 7, 1935.  M. P. BROWNE  2,000,463
SLIDING SEAT MOUNTING FOR VEHICLES
Filed March 3, 1932
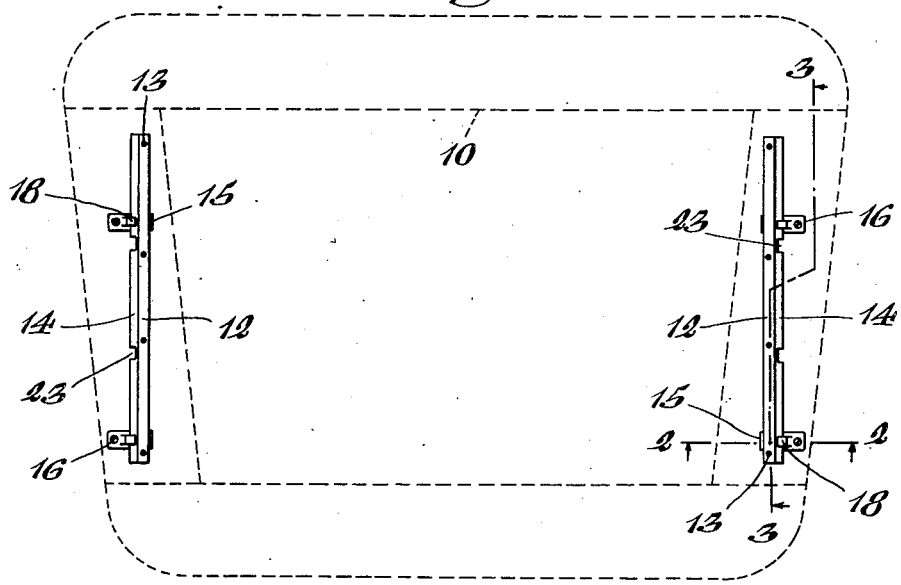
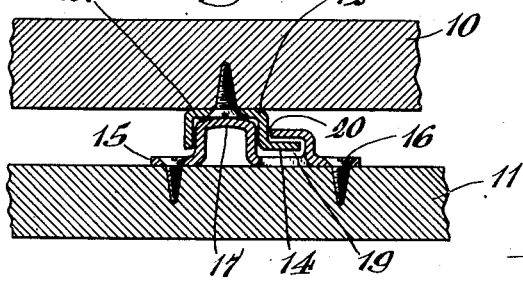
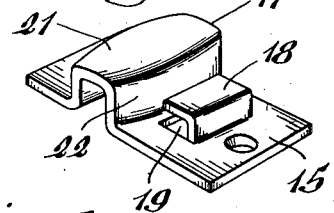
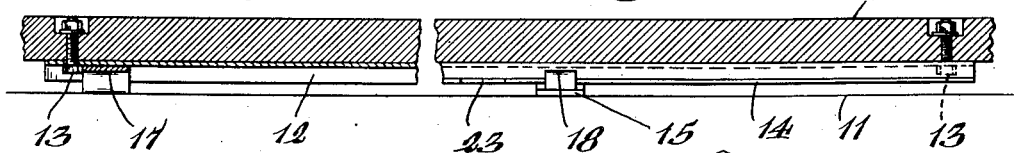
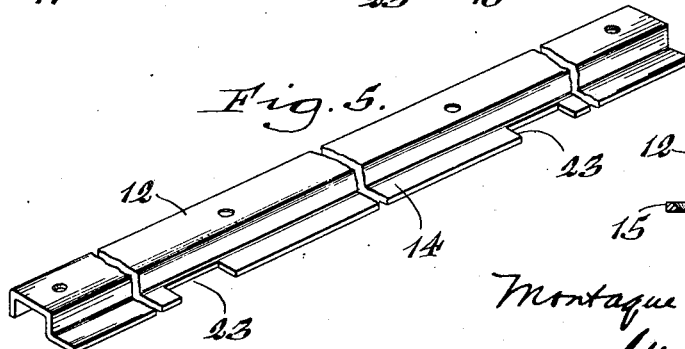
Inventor,
Montague P. Browne,
by Walter P. Geyer
Attorney.

Patented May 7, 1935

2,000,463

UNITED STATES PATENT OFFICE 2,000,463

SLIDING SEAT MOUNTING FOR VEHICLES

Montague P. Browne, Buffalo, N. Y., assignor to Mechanical Devices Corporation of America, Buffalo, N. Y., a corporation of New York Application March 3, 1932, Serial No. 596,499

6 Claims. (Cl. 155—14)

This invention relates generally to automobile seats but more particularly to a mounting therefor designed to permit the sliding of the seat to a position convenient for the driver in operating the car or to facilitate the ingress and egress of passengers to and from the rear seat of the automobile.

One of the objects of the invention is the provision of a seat mounting of this character which is simple, compact and inexpensive in construction, and whose parts are so designed and organized as to facilitate the ready attachment of the same to the vehicle.

Another object is the provision of a sliding seat mounting for automobiles and the like having complementary or companion guide means which are constructed to prevent lateral as well as vertical displacement of the seat relative to the floor, and which at the same time permit a free gliding action of the seat to any desired adjusted position.

In the accompanying drawing:—

Figure 1 is a top plan view of my improved seat mounting, the vehicle seat being shown in outline by dotted lines. Figure 2 is an enlarged transverse section thereof taken on line 2—2, Figure 1. Figure 3 is an enlarged fragmentary longitudinal section taken on lines 3—3, Figure 1. Figure 4 is a perspective view of one of the floor brackets or guide members which constitutes one of the elements of the seat mounting. Figure 5 is a similar view of one of the seat-bearing members or guide rails which constitutes one of the companion elements of the seat mounting. Figure 6 is a cross section, similar to Figure 2, showing a slightly modified form of the invention.

Similar characters of reference indicate corresponding parts throughout the several views.

By way of example, the invention is shown in connection with a longitudinally adjustable automobile seat, the base frame 10 of which is shown by dotted lines in Figure 1 and by full lines in Figures 2 and 3. Applied to the floor 11 and the underside of the seat-frame are complementary seat guiding means which serve to support the seat at its opposite sides and guide it longitudinally when shifting the same to a desired set position. It is to be understood that any suitable holding means may be employed for latching the seat in a set position, and as such means forms no part of the present invention, it has not been deemed necessary to show the same.

In the preferred construction of the seat-guiding means, the same consists of a pair of guide members, 12, 12 in the form of longitudinal channel bars or rails adapted for attachment to the underside of the seat-frame adjacent its opposite sides and secured thereto by bolts 13 or other appropriate fasteners. These guide rails are applied to the seat frame with their channels facing downwardly and one of the depending side walls of each rail, preferably the outer one, is provided with an outwardly-facing tongue or flange 14 which is coextensive with the length of the rail.

Mounted on the floor of the vehicle below the guide rails 12 of the seat are pairs of longitudinally spaced guide members or floor brackets 15, which brackets are arranged crosswise of the guide rails and are fastened at their ends to the floor 11 by screws 16 or like fasteners. Rising from each floor bracket and preferably intermediate the ends thereof is a guide-head or post 17 for receiving the guide rails 12 in the manner shown in Figures 2 and 3, whereby the seat is evenly supported and guided for longitudinal movement and held against lateral displacement. Alongside the guide-head 17 is an upwardly and inwardly bent flange 18 which forms a horizontal guide groove 19 with the base of the bracket 15, and which flange terminates at its inner edge short of such head to form an upright passageway 20 communicating with said groove 19. The rail-flange 14 is adapted to engage the groove formed by the overhanging bracket-flange 18 and the adjoining wall of the guide rail is adapted to extend through the passage 20, in the manner shown in Figure 2. By this construction, the sliding seat is maintained in a straight path of travel and is effectively held against vertical displacement, the longitudinally-spaced brackets 15 with their flanges 18 preventing any tilting or vertical displacement of the seat.

To facilitate the gliding action of the seat in being shifted to a desired position, the top face of the guide-head 17 is preferably made convex as indicated at 21 in Figure 2, and the opposite sides of said head are likewise of convex shape as indicated at 22 in Figure 3. By this construction, friction between the parts is reduced to a minimum and a free sliding of the seat afforded.

As shown in Figures 2 and 3, the floor brackets 15 together with their parts 17 and 18 are preferably formed in one piece and may be made of a stamping or casting as desired.

For the purpose of readily effecting the application or removal of the seat, together with its guide rails 12, 12, to and from the floor brackets 15, I preferably provide the rail-flanges 14 with notches 23 which are somewhat wider than the bracket-flanges 18, and which are adapted to register with such flanges in predetermined positions of the seat to effect the insertion and removal of the guide rails to and from the brackets. The longitudinal spacing of these notches in the rails 12 is such that the front set will register with the companion bracket-flanges 18 when the seat is in, say a substantially forward position, while the rear set of notches will register with their companion bracket-flanges in the rearward position of the seat.

The forward and backward movement of the seat may be limited by the heads of the rail-fastening bolts 13, which bolt-heads extend into the guide channels of the rail, adjacent their opposite ends as seen in Figure 3, and are adapted to abut against the companion guide-heads 17 of the floor bracket 15 and thus positively limit the extreme sliding action of the seat.

In the modified form of the invention shown in Figure 6, the top side of the guide-head 17 is provided with a lubricating element 24 of graphite or like material, which may be seated in a recess provided for receiving it, and over which the seat-rail 12 passes.

I claim as my invention:—

1. A sliding seat mounting for automobiles and the like, comprising a member adapted for attachment to the floor and having a guide-head rising therefrom and a guide-groove arranged parallel thereto and opening laterally toward said head, and a second member adapted for attachment to the seat and having a guideway engaging said guide-head and a laterally projecting guide-tongue engaging said guide-groove.

2. A sliding seat mounting for automobiles and the like, comprising a member adapted for attachment to the floor and having a guide-head rising therefrom and an upwardly and inwardly bent flange disposed alongside the guide-head to form a guide-groove opening laterally toward said head, and a second member adapted for attachment to the seat and having a channel-way engaging said guide-head and an outwardly-facing flange engaging said guide-groove.

3. A sliding seat mounting for automobiles and the like, comprising a member adapted for attachment to the floor and having a guide-head rising therefrom and an upwardly and inwardly bent flange disposed alongside the guide-head to form a guide-groove opening laterally toward said head, said flange terminating short of the head to form a passage way, and a channel-rail adapted for attachment to the seat for engaging said guide-head, one of the side walls of said rail extending through said passage way and terminating at its lower edge in an outwardly-facing flange engaging said guide groove.

4. A sliding seat mounting for automobiles and the like, comprising a member adapted for attachment to the floor and having a guide-head rising therefrom and a guide-groove arranged parallel thereto and opening laterally toward said head, the top face and side walls of the head being convex in shape, in directions crosswise and lengthwise of said head, respectively, and a second member adapted for attachment to the seat and having a guideway engaging said guide-head and a laterally projecting guide-tongue engaging said guide-groove.

5. A sliding seat mounting for automobiles and the like, comprising a member adapted for attachment to the floor and having a guide-head rising therefrom and an upwardly and inwardly bent flange disposed alongside the guide-head to form a guide-groove opening laterally toward said head, and a second member adapted for attachment to the seat and having a channel-way engaging said guide-head and an outwardly-facing flange engaging said guide-groove, the flange of said second member having a notch therein arranged to register with the flange of said first member in a predetermined position of such members.

6. A sliding seat mounting for automobiles and the like, comprising a pair of channel rails adapted for attachment to the seat adjacent its opposite sides, one of the side walls of each rail terminating at its lower edge in an outwardly-facing flange, pairs of longitudinally spaced floor-brackets adapted for attachment to the vehicle-floor beneath said rails and each including a guide-head rising therefrom for reception within the channel rails and an upwardly and inwardly-bent flange disposed alongside the guide-head to form a guide-groove opening laterally toward said head to receive the corresponding rail-flange, the latter having longitudinally-spaced notches therein arranged to register with the corresponding bracket-flanges to effect the application and removal of the seat-rails to and from the floor-brackets.

MONTAGUE P. BROWNE.